(12) United States Patent
Lowe et al.

(10) Patent No.: US 7,656,968 B2
(45) Date of Patent: Feb. 2, 2010

(54) RADIO RECEIVER, SYSTEM ON A CHIP INTEGRATED CIRCUIT AND METHODS FOR USE THEREWITH

(75) Inventors: Erich Lowe, Austin, TX (US); Michael R. May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 610 days.

(21) Appl. No.: 11/287,571

(22) Filed: Nov. 22, 2005

(65) Prior Publication Data
US 2007/0116148 A1 May 24, 2007

(51) Int. Cl.
*H03K 9/00* (2006.01)
*H04L 27/00* (2006.01)

(52) U.S. Cl. .................. 375/316; 375/327; 375/354; 375/373; 375/376

(58) Field of Classification Search ................. 375/316, 375/327, 354, 373, 376
See application file for complete search history.

(56) References Cited

U.S. PATENT DOCUMENTS

| | | | |
|---|---|---|---|
| 5,448,245 A | 9/1995 | Takase | |
| 5,889,759 A | 3/1999 | McGibney | |
| 5,987,620 A | 11/1999 | Tran | |
| 6,021,110 A | 2/2000 | McGibney | |
| 6,633,187 B1 | 10/2003 | May et al. | |
| 6,728,325 B1 | 4/2004 | Hwang et al. | |
| 7,391,347 B2 * | 6/2008 | May et al. | 341/117 |
| 2002/0064245 A1 | 5/2002 | McCorkle | |
| 2002/0111785 A1 | 8/2002 | Swoboda et al. | |
| 2005/0117071 A1 * | 6/2005 | Johnson | 348/729 |

FOREIGN PATENT DOCUMENTS

WO   WO 2004/039011   5/2004

OTHER PUBLICATIONS

International Search Report and Written Opinion, International Application No. PCT/US06/30209, Sep. 28, 2007.

* cited by examiner

*Primary Examiner*—Ted Wang
(74) *Attorney, Agent, or Firm*—Toler Law Group (57) ABSTRACT

A system on a chip integrated circuit includes an analog front end for receiving a received radio signal having a plurality of channel signals, each of the plurality of channel signals being modulated at one of a corresponding plurality of carrier frequencies, and for converting a selected one of the plurality of channel signals into a digital signal. A digital clock generator generates a digital clock signal at a digital clock frequency that varies based on the selected one of the plurality of channel signals. The digital clock frequency, and integer multiples of the digital clock frequency, are not substantially equal to the carrier frequency of the selected one of the plurality of channel signals. A digital section converts the digital signal into at least one audio signal that corresponds to the selected one of the plurality of channels, based on the digital clock signal.

17 Claims, 8 Drawing Sheets

ID CARD # US 7,656,968 B2

RADIO RECEIVER, SYSTEM ON A CHIP INTEGRATED CIRCUIT AND METHODS FOR USE THEREWITH

CROSS REFERENCE TO RELATED PATENTS

The present application is related to the following U.S. patent applications that are commonly assigned:

Receiver and methods for use therewith, having Ser. No. 11,237,339, filed on Sep. 28, 2005;

Mixing module and methods for use therewith, having Ser. No. 11/237,344, filed on Sep. 28, 2005;

Controllable phase locked loop and method for producing an output oscillation for use therewith, having Ser. No. 11/126,553, filed on May 11, 2005;

Controllable phase locked loop via adjustable delay and method for producing an output oscillation for use therewith, having Ser. No. 11/153,144, filed on Jun. 15, 2005;

Programmable sample rate analog to digital converter and method for use therewith, having Ser. No. 11/152,910, filed on Jun. 15, 2005;

Clock generator, system on a chip integrated circuit and methods for use therewith, having Ser. No. 11/287,550, filed on Nov. 22, 2005; the contents of which are expressly incorporated herein in their entirety by reference thereto.

TECHNICAL FIELD OF THE INVENTION

The present invention relates to radio receivers used in devices such as system on a chip integrated circuits, and related methods.

DESCRIPTION OF RELATED ART

Radio receivers can be implemented in integrated circuits that can provide an entire receiver front end on a single chip. One concern in the design of these circuits is the amount of noise that is produced. When implemented in a radio receiver, it is desirable for the noise of these circuits to be as low as possible. Digital circuit designs can reduce the amount of analog noise, such as thermal noise that is introduced. However, other sources of noise can be present. The presence of periodic switching events and other signals within the frequency band of the input circuitry can cause undesirable spurs from switching events. Digital clocks and their harmonics also produce tones that can degrade performance in the analog circuitry.

The need exists for a low noise radio receiver that can be implemented efficiently on an integrated circuit with digital components.

DETAILED DESCRIPTION OF THE INVENTION INCLUDING THE PRESENTLY PREFERRED EMBODIMENTS

The embodiments of the present invention yield several advantages over the prior art. The present invention details an implementation for an efficient architecture for receiving a radio signal. A digital clock frequency varies with the carrier frequency of a received signal, and is controlled so that its fundamental and harmonics do not interfere with the processing of the received signal. This advantage as well as others will apparent to one skilled in the art when presented the disclosure herein.

Figure 1:
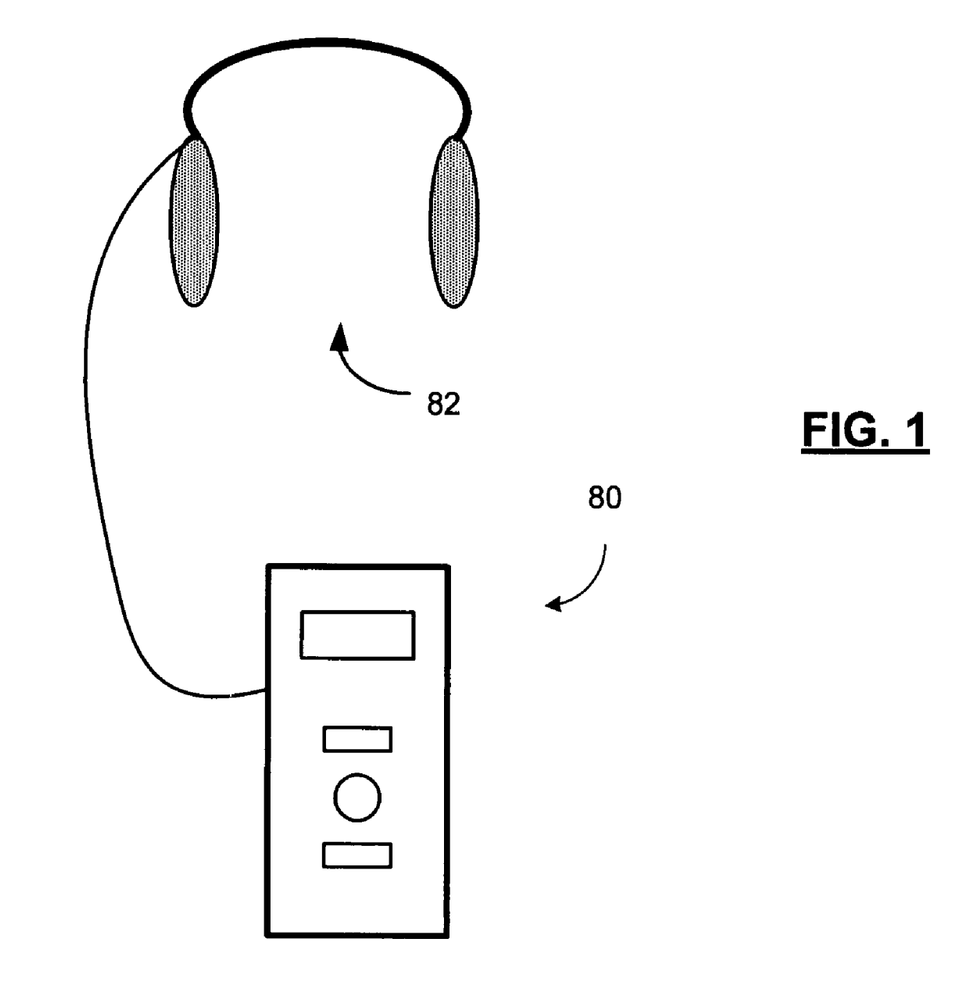
FIG. 1 presents a pictorial diagram of a handheld audio system in accordance with an embodiment of the present invention.

FIG. 1 presents a pictorial diagram of a handheld audio system in accordance with an embodiment of the present invention. In particular, a handheld audio system 80 is shown that receives a radio signal that carries at least one composite audio channel that includes right and left channel stereo audio signals. In an embodiment of the present invention, the radio signal includes one or more of a broadcast frequency modulated (FM) radio signal, a broadcast amplitude modulated (AM) radio signal, an in-band on-channel (IBOC) digital radio signal, a Bluetooth signal, a broadcast satellite radio signal, and a broadcast cable signal.

In operation, the handheld audio system 80 produces an audio output for a user by means of headphones 82 or other speaker systems. In addition to producing an audio output from the received radio signal, the handheld audio system 80 can optionally process stored MP3 files, stored WMA files, and/or other stored digital audio files to produce an audio output for the user. The handheld audio system may also include video features as well. Handheld audio system 80 includes a radio receiver and/or one or more integrated circuits (ICs) that implement the features and functions in accordance with one or more embodiments of the present invention that are discussed herein.

Figure 2:
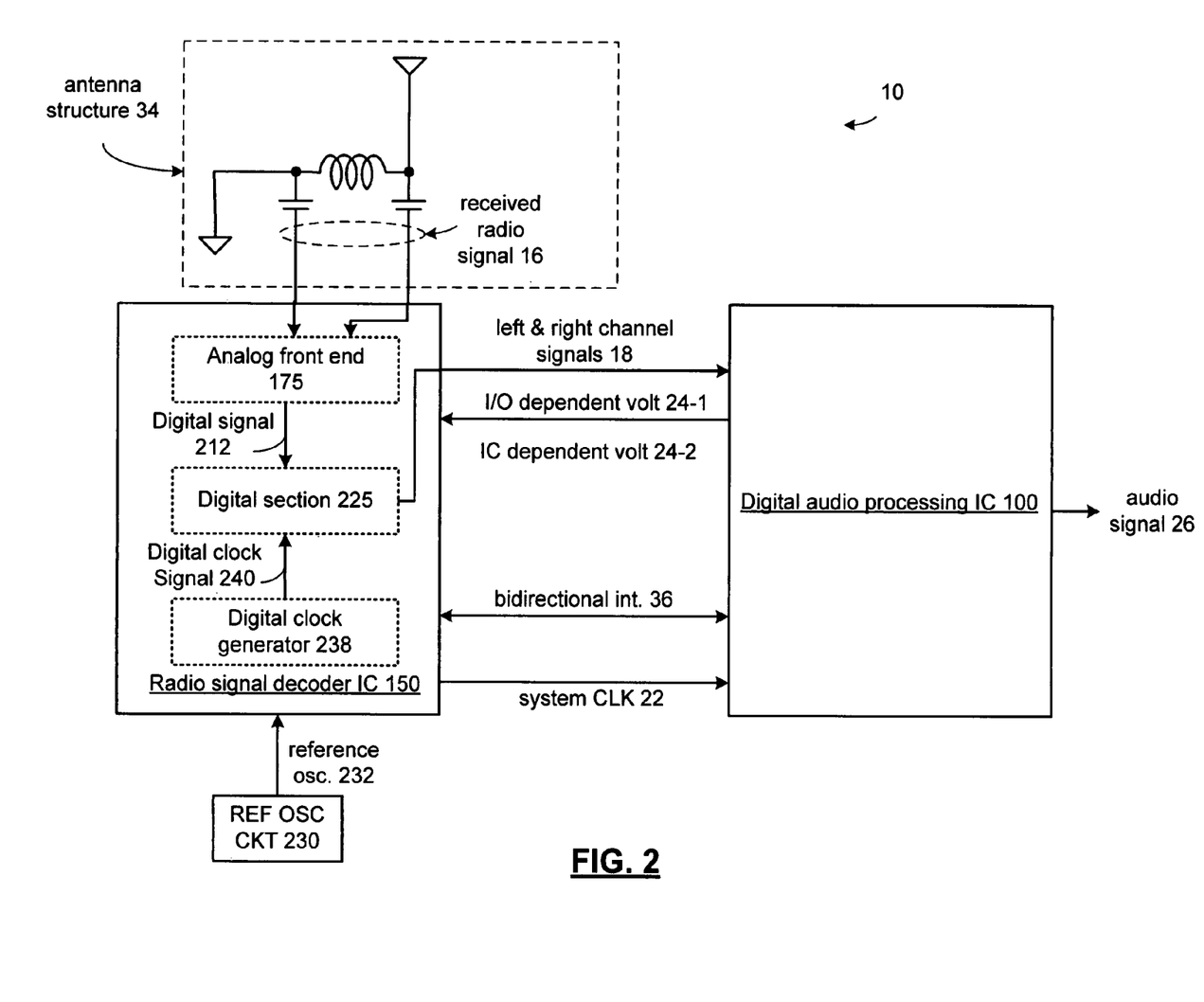
FIG. 2 presents a schematic block diagram of a radio receiver in accordance with an embodiment of the present invention.

FIG. 2 presents a schematic block diagram of a radio receiver in accordance with an embodiment of the present invention. In particular, radio receiver 10 is presented that includes a radio signal decoder integrated circuit 150 that includes an analog front end 175, digital clock generator 238, digital section 225 and/or corresponding methods in accordance with FIGS. 3-9, and a digital audio processing integrated circuit 100. In this embodiment, the radio signal decoder integrated circuit 150 is operably coupled to a reference oscillator circuit 230 and an antenna structure 34. The reference oscillation circuit 230 is operably coupled to a crystal and produces therefrom a reference oscillation 232 and a system clock 22 that is provided to digital audio processing IC 100.

The antenna structure 34 includes an antenna, a plurality of capacitors and an inductor coupled as shown. The received radio signal 16 is provided from the antenna structure 34 to the radio signal decoder integrated circuit 150. The radio signal decoder integrated circuit 150 converts the received radio signal 16 into left and right channel signals 18.

The digital audio processing integrated circuit 100, via a DC-DC converter, generates an input/output (I/O) dependent supply voltage 24-1 and an integrated circuit (IC) dependent voltage 24-2 that are supplied to the radio signal decoder IC 150. In one embodiment, the I/O dependent voltage 24-1 is dependent on the supply voltage required for input/output interfacing of the radio signal decoder IC and/or the digital audio processing IC 14 (e.g., 3.3 volts) and the IC dependent voltage 24-2 is dependent on the IC process technology used to produce integrated circuits 150 and 100. The digital audio processing integrated circuit 100 further includes a processing module that may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory stores, and the processing module executes, operational instructions corresponding to at least some of the steps and/or functions illustrated in the Figures that follow.

The interface between the integrated circuits 150 and 100 further includes a bi-directional interface 36. Such an interface may be a serial interface for the integrated circuits 150 and 100 to exchange control data and/or other type of data. In one embodiment, the bi-directional interface 36 may be one or more serial communication paths that are in accordance with the I²C serial transmission protocol. As one of ordinary skill in the art will appreciate, other serial transmission protocols may be used for the bi-directional interface 36 and the bi-directional interface 36 may include one or more serial transmission paths.

In an embodiment of the present invention, radio signal decoder IC 150 is a system on a chip integrated circuit that operates as follows. Analog front end 175 receives received radio signal 16 having a plurality of channel signals, each of the plurality of channel signals being modulated at one of a corresponding plurality of carrier frequencies. Analog front end 175 is operable to convert a selected one of the plurality of channel signals into a digital signal 212. Digital clock generator 238 generates a digital clock signal 240 at a digital clock frequency that varies based on the selected one of the plurality of channel signals. Digital section 225 is operably coupled to the analog front end 175, and converts the digital signal 212 into at least one audio signal, such as left and right channel signals 18, that correspond to the selected one of the plurality of channels, based on the digital clock signal 212. The digital clock frequency, and the harmonics that are created at integer multiples of the digital clock frequency, are not substantially equal to the carrier frequency of the selected one of the plurality of channel signals.

Choosing the digital clock frequency in this fashion avoids a situation where either the fundamental or one of the harmonics of the digital clock signal 212 is equal to the carrier frequency of the selected channel. If one of these signals had a frequency that was substantially equal to the carrier frequency, it could also lead to portions of the digital clock signal 240 being introduced into the input of the analog front end 175, interfere with processing of the received radio signal 16 and could show up as increased noise or decreased spurious free dynamic range at one or more portions of radio signal decoder IC 150.

Figure 3:
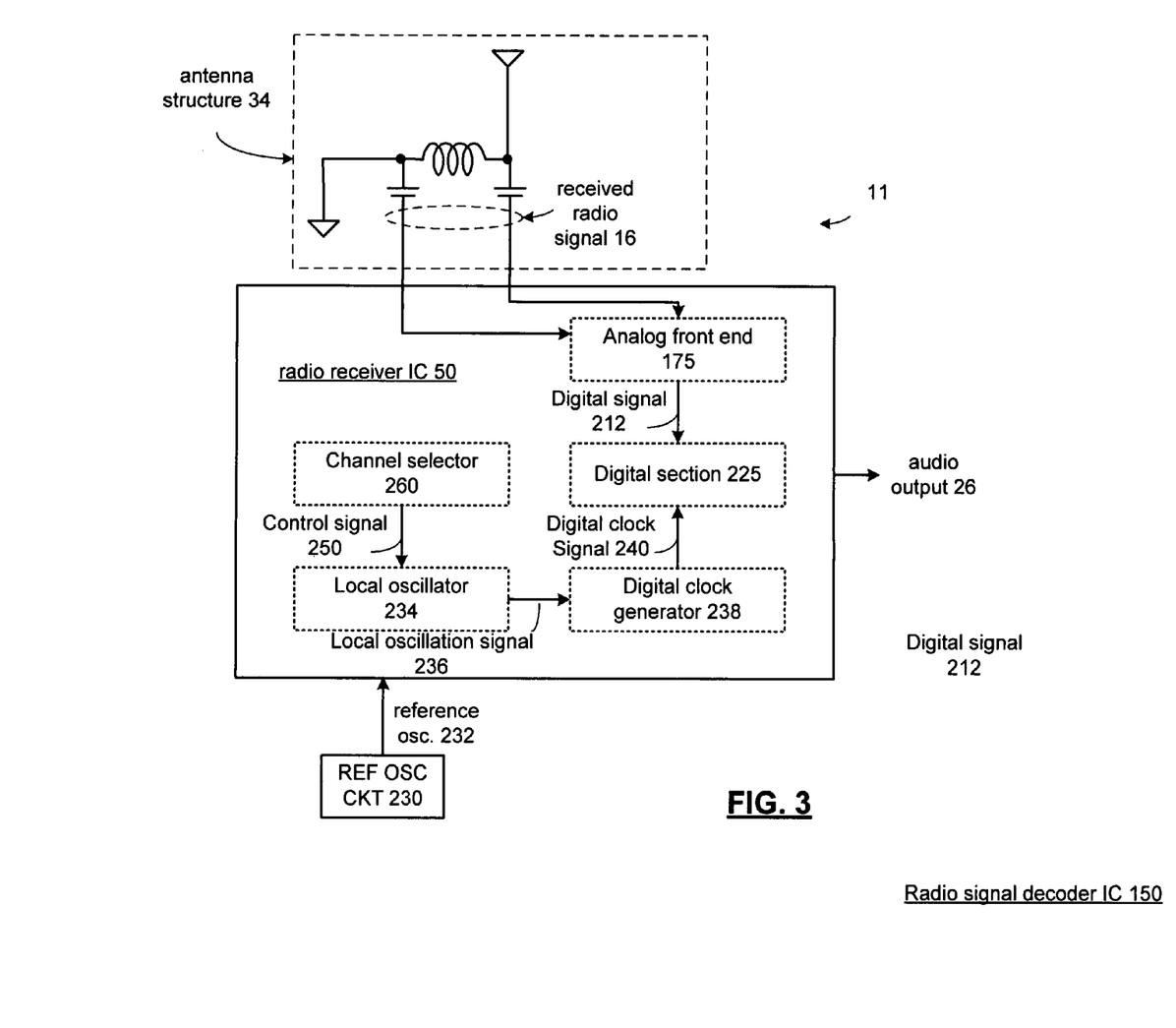
FIG. 3 presents a schematic block diagram of a radio receiver in accordance with an alternative embodiment of the present invention.

FIG. 3 presents a schematic block diagram of a radio receiver in accordance with an alternative embodiment of the present invention. In particular, a schematic block diagram of a radio receiver 11 is presented that includes the functionality of radio receiver 10 presented in an alternative system on a chip configuration. In this embodiment, the functionality of radio signal decoder IC 150 and digital audio processing IC 100 are incorporated into a single integrated circuit, radio receiver IC 50. In particular, radio receiver IC 50 includes analog front end 175, digital clock generator 238, as described in conjunction with FIG. 2. In addition, a channel selector 260, produces a control signal 250 that corresponds to the selected one of the plurality of channels. A local oscillator 234 is operably coupled to the analog front end 175 and a reference oscillation 232, for generating a local oscillation signal 236 based on the control signal 250. In this fashion, as the selected channel is changed to a new channel, the digital clock frequency is controlled so as to continue this advantageous relationship between the digital clock frequency and the new carrier frequency. In operation, handheld audio system 11 implements one or more of the features and functions of other embodiments of the present invention described in conjunction with FIGS. 1-9.

In addition to the configurations shown in FIG. 2 and FIG. 3, other configurations that include one or more integrated circuits are likewise possible. The broad scope of the present invention includes other partitioning of the various elements of radio receiver 11 into one or more integrated circuits.

Figure 4:
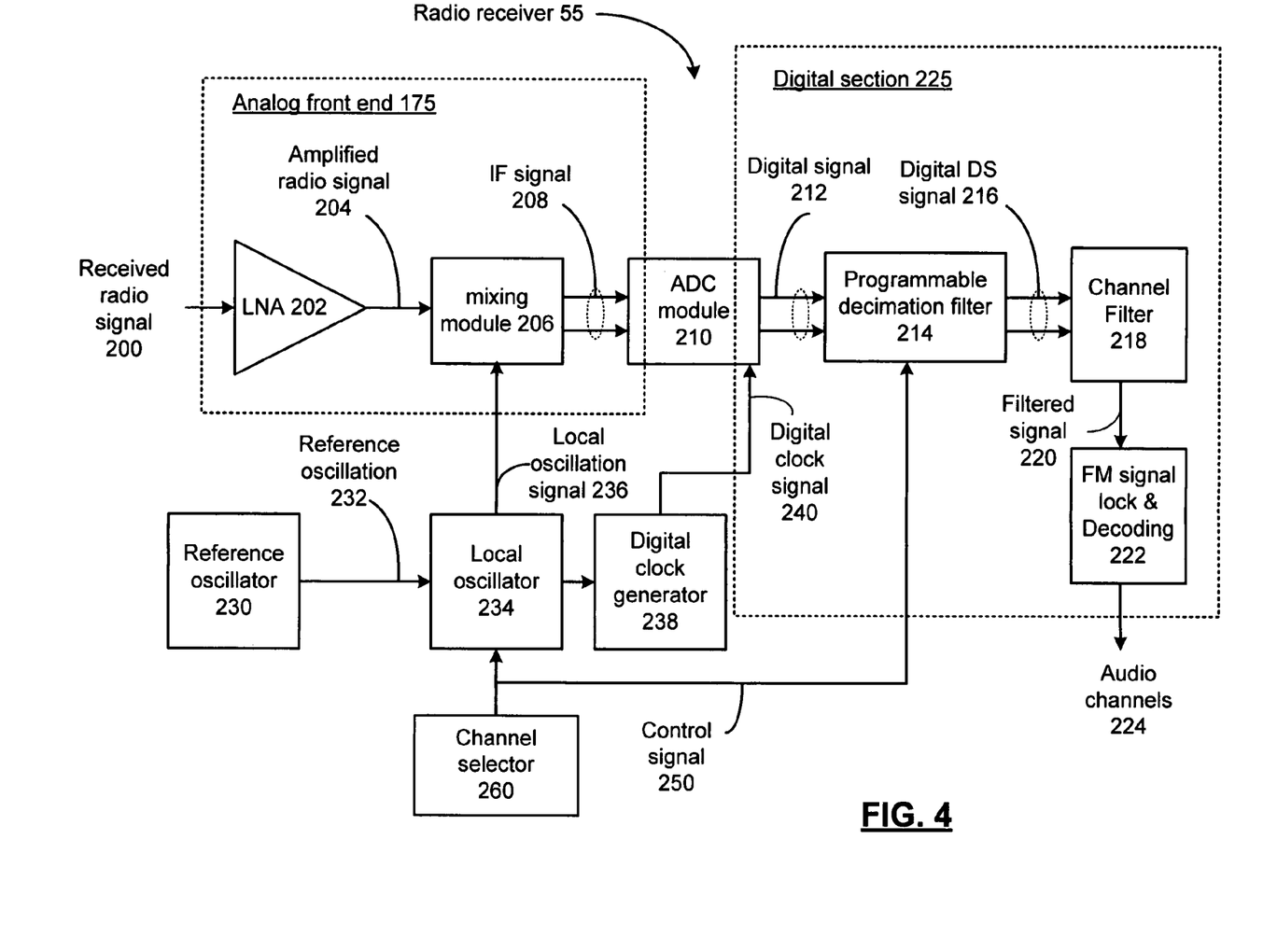
FIG. 4 presents a combination block diagram and schematic diagram of a radio receiver in accordance with an embodiment of the present invention.

FIG. 4 presents a combination block diagram and schematic diagram of a radio receiver in accordance with an embodiment of the present invention. In particular, a radio receiver 55 receives a received radio signal 200 that includes a plurality of broadcast FM channel signals, each of the plurality of channel signals being modulated at one of a corresponding plurality of carrier frequencies. Reference oscillator 230 produces a reference oscillation 232 that is transformed by local oscillator 234 into a local oscillation signal 236 at a local oscillation frequency. A channel selector 260 produces control signal 250 that selects the local oscillation frequency for local oscillator 234 corresponding to a selection of one of the plurality of channels. In an embodiment of the present invention, local oscillator 234 includes a phase locked loop circuit for producing a selected local oscillation frequency based on the selected one of the plurality of channels.

Low noise amplifier 202 produces a amplified radio signal 204 that is sampled and mixed with the local oscillation signal 236 by mixing module 206 to form a discrete time IF signal 208 at an intermediate frequency. In a preferred embodiment of the present invention, the gain at which the low noise amplifier 202 amplifies the receive signal 200 is dependent on the magnitude of the received radio signal 200 and an automatic gain control circuit. Note that IF signal 208 is a modulated signal and if the local oscillation signal 236 has an effective frequency (when considering the sample rate) that matches the frequency of the selected channel, the IF signal 208 will have a carrier frequency of approximately zero. If the local oscillation signal 236 has an effective frequency that is not equal to the carrier frequency of received radio signal 200, then the IF signal 208 will have a carrier frequency based on the difference between the carrier frequency of the selected channel and the effective frequency of local oscillation 236. In such a situation, the carrier frequency of the IF signal 208 may range from 0 hertz to one megahertz or more.

Analog to digital converter (ADC) module 210 converts the IF signal 208 into a digital signal 212, based on clock signal 240. As noted above, digital signal 212 may or may not be down-converted to baseband. Programmable decimation filter 214 converts the digital signal 212 into a digital downsampled (DS) signal 216, in response to control signal 250. Digital clock signal 240 is a variable frequency clock and varies as a function of local oscillation signal 236. As digital clock signal 240 is adjusted to convert analog data to digital data at various rates, programmable decimation filter 214 adjusts to produce digital downsampled signal 216 at a roughly constant output rate so that channel filter 218, a digital filter that provides channel separation and produces filtered signal 220, can employ constant coefficients. FM signal lock and decoding module 222, tracks the FM signal via the 19 kHz pilot signal and produces audio channel signals 224, such as left and right channel signals 18.

While the description above includes a programmable decimation filter that adjusts with the digital clock frequency, other implementations are likewise possible, including a fixed decimation filter and variable channel filter, etc., within the broad scope of the present invention.

Consider the operation of the radio receiver 55 in light of the following example. In this example, received radio signal 200 is a frequency modulated (FM) broadcast signal that includes a plurality of channels that are spaced 200 kHz apart in the range of 76 MHz to 108 MHz. Consider further a selected channel to be received that operates at a carrier frequency of 100.1 MHz. Channel selector 260 generates a control signal 250 that includes a 7 bit signal that commands local oscillator 234 to produce a 400 MHz local oscillation signal 236 from reference oscillation 232.

Low noise amplifier 202 amplifies and passes the entire 76 MHz-108 MHz broadcast band as amplified radio signal 200. Mixing module 206 samples the amplified radio signal 204 at 400 MHz, down converts and filters the output to produce an IF signal 208, at or near baseband, having a 200 kHz bandwidth, corresponding to the broadcast FM channel whose carrier frequency was 100 MHz. ADC module 210 converts the IF signal 208 into a digital signal 212 based on a digital clock signal 240 having a frequency of 66.67 MHz, that is formed by dividing the local oscillator signal by a factor D=6, producing a frequency that is substantially equal to ⅔ of the carrier frequency of the received signal. Harmonics of the digital clock signal appear at 133.33 MHz, 200 MHz, 266.67 MHz, . . . , all at frequencies that are spaced from the 100 MHz carrier frequency so as to reduce harmful interference.

In further examples, corresponding to the selection of other FM broadcast channels, higher frequency channels require higher local oscillator frequencies and correspondingly higher frequencies for clock signal 240 that are, in an embodiment of the present invention substantially equal to ⅔ of the carrier frequency of the received signal. While the ratio ⅔ is used, digital clock frequencies at other ratios, both less than and greater than the carrier frequency are likewise possible within the broad scope of the present invention. While the example above discusses a mixing module 206 that operates by sampling amplified radio signal 204, other configurations with continuous time processing are likewise possible within the broad scope of the present invention.

In a preferred embodiment of the present invention, the IF signal 208, digital signal 212, digital downsampled signal 214 each include an in-phase signal and a quadrature-phase signal forming parallel signal paths through these portions of radio receiver 55.

Figure 5:
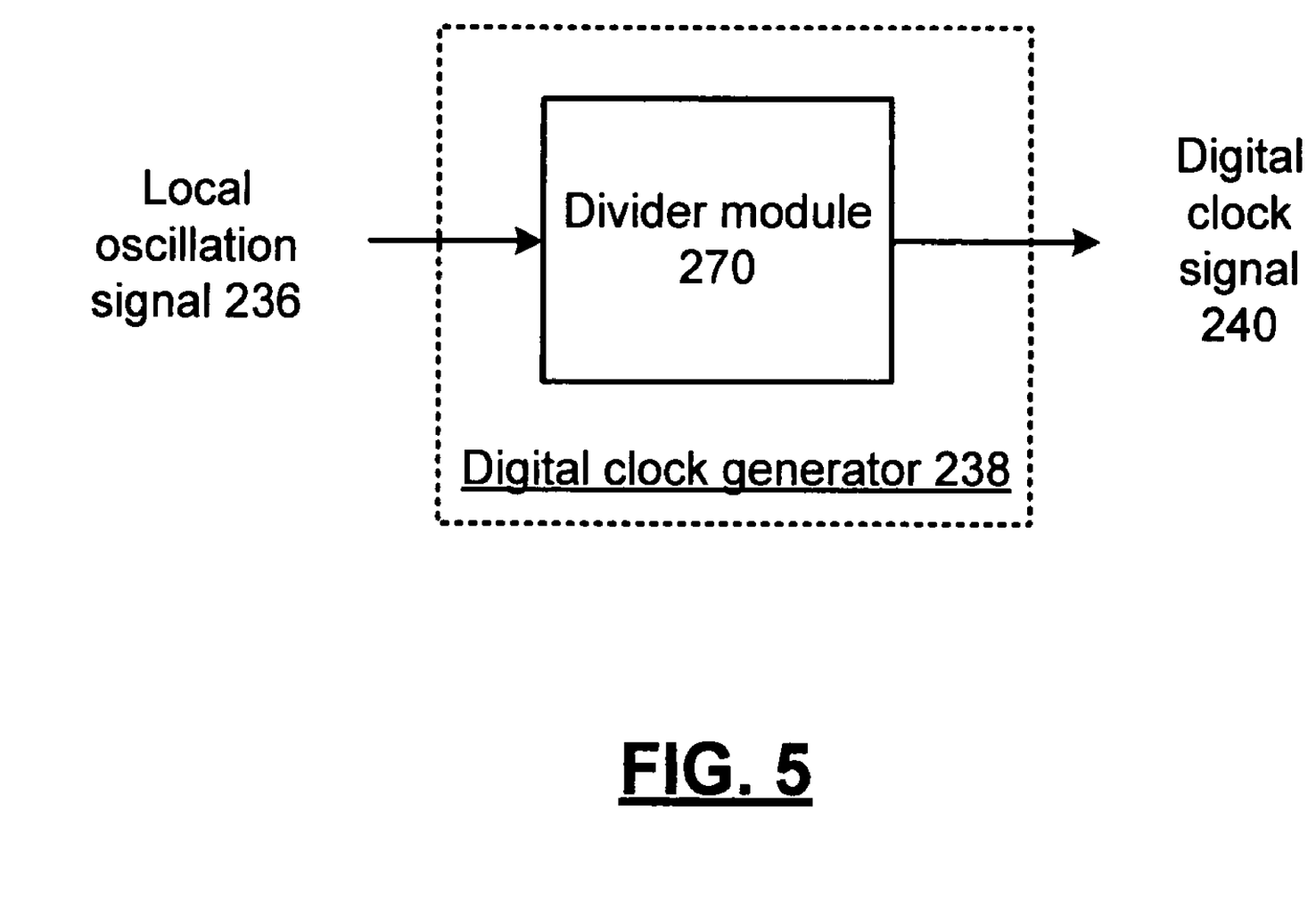
FIG. 5 presents a block diagram representation of a digital clock signal generator in accordance with an embodiment of the present invention.

FIG. 5 presents a block diagram representation of a digital clock signal generator in accordance with an embodiment of the present invention. In particular, digital clock signal 240 is formed by dividing the local oscillation 236 using divider module 270 that divides the frequency of local oscillation 236 by a factor, D. In an embodiment of the present invention, D is an integer value, such as 6, and divider module 270 employs shift registers, flip-flops and/or counters. In an alternative embodiment of the present invention, divider module 270 is implemented using a fractional divider that allows D to be a mixed number with both an integer and factional component, as will be evident to one of ordinary skill in the art based on the teachings disclosed herein. Also, a phase locked loop circuit could be used to multiply up by N, and divide by M, to achieve a ratio of integers to implement D.

With digital clock signal 240 being a divided version of local oscillation 236, noise spurs that would be created by the presence of two independent signals, are avoided. The expense of this configuration is that as digital clock signal 240 varies, as the frequency of local oscillation 236 varies, with the selection of different radio channels. However, control signal 250 that controls the local oscillator 232 to tune the analog front end 175 to a particular channel, also commands the programmable decimation filter 214 to select a down sampling factor N that substantially corrects for the variation in the frequency of clock signal 240, allowing channel filter 218 to employ coefficients that are independent from control signal 250, the frequency of digital clock signal 240 and the particular radio channel that is selected.

Figure 6:
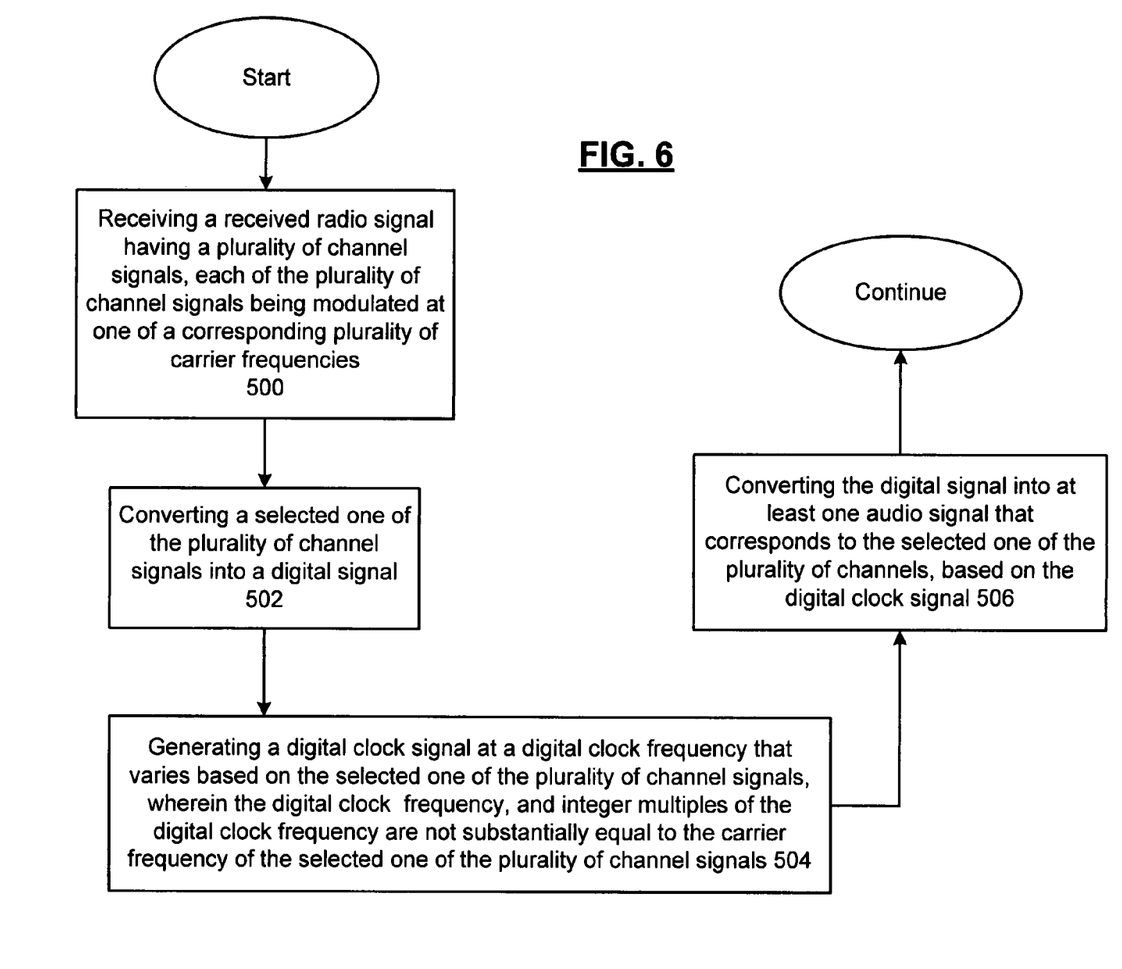
FIG. 6 presents a block diagram of a method in accordance with an embodiment of the present invention.

FIG. 6 presents a block diagram of a method in accordance with an embodiment of the present invention. In particular, a method is presented for use in conjunction with embodiments presented in FIGS. 1-5. The method begins in step 500 by receiving a received radio signal having a plurality of channel signals, each of the plurality of channel signals being modulated at one of a corresponding plurality of carrier frequencies. In step 502, a selected one of the plurality of channel signals is converted into a digital signal. In step 504, a digital clock signal is generated at a digital clock frequency that varies based on the selected one of the plurality of channel signals. In step 506, the digital signal is converted into at least one audio signal that corresponds to the selected one of the plurality of channels, based on the digital clock signal, wherein the digital clock frequency, and integer multiples of the digital clock frequency are not substantially equal to the carrier frequency of the selected one of the plurality of channel signals.

In an embodiment, the digital clock frequency is less than the carrier frequency of the selected one of the plurality of channel signals and takes on a value such as substantially equal to two-thirds of the carrier frequency of the selected one of the plurality of channel signals. In an embodiment, the received radio signal is one of: a broadcast frequency modulated radio signal, a broadcast amplitude modulated radio signal, a broadcast satellite radio signal, and a broadcast cable signal. In an embodiment, the step of receiving includes processing the received radio signal along an in-phase signal path and a quadrature-phase signal path.

Figure 7:
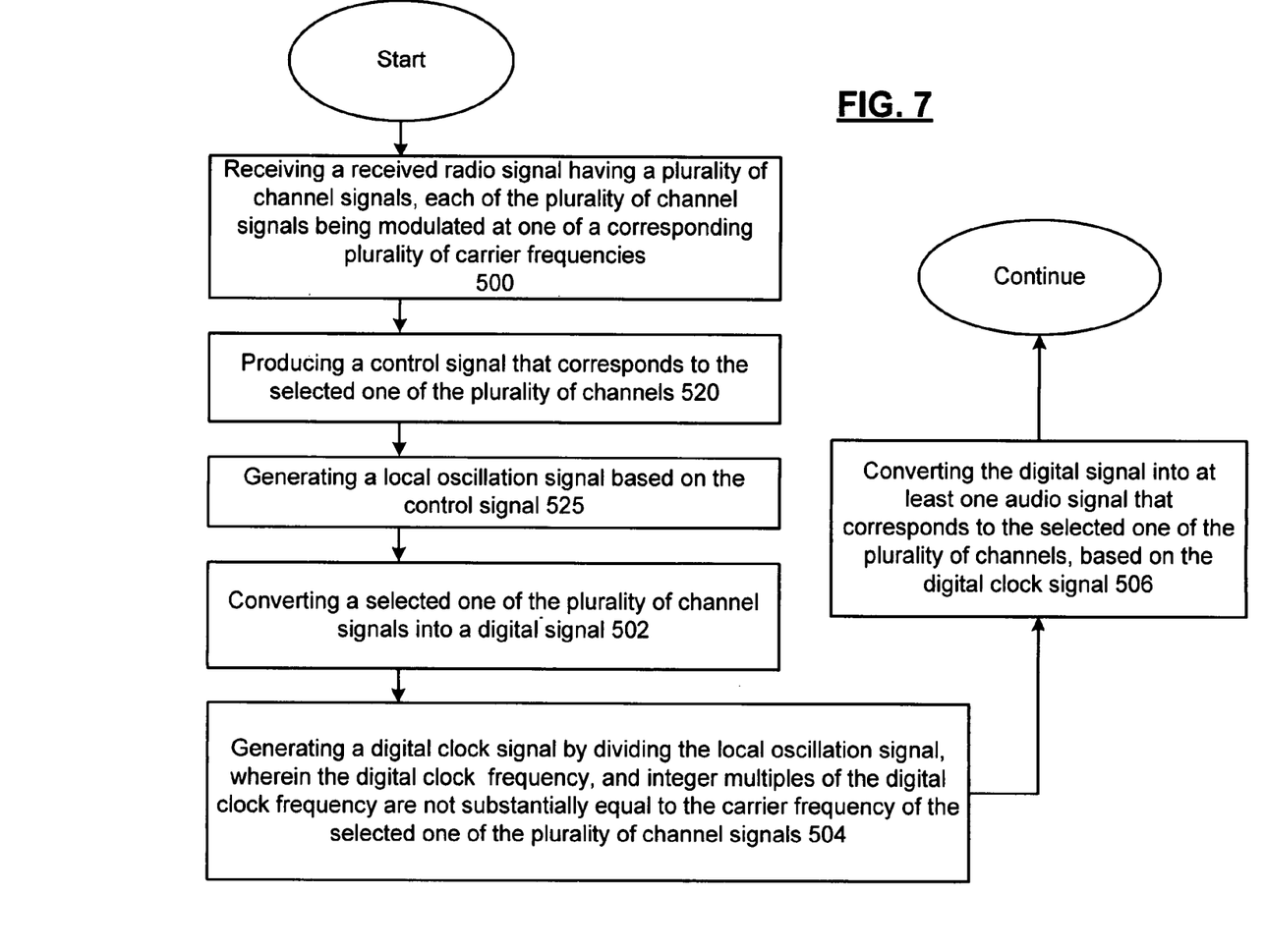
FIG. 7 presents a block diagram of a method in accordance with an embodiment of the present invention.

FIG. 7 presents a block diagram of a method in accordance with an embodiment of the present invention. In particular, a method is presented for use in conjunction with embodiments presented in FIGS. 1-6. The method contains steps 500, 502, 504, and 506 from FIG. 6. In addition, the method contains step 520 for producing a control signal that corresponds to the selected one of the plurality of channels. In step 525, a local oscillation signal is generated based on the control signal. In an embodiment of the present invention step 500 includes mixing the received signal by the local oscillation signal and wherein the step 504 includes dividing the local oscillation signal to produce the digital clock signal. In an embodiment of the present invention, the step of dividing includes dividing by an integer, wherein the integer can be equal to 6.

Figure 8:
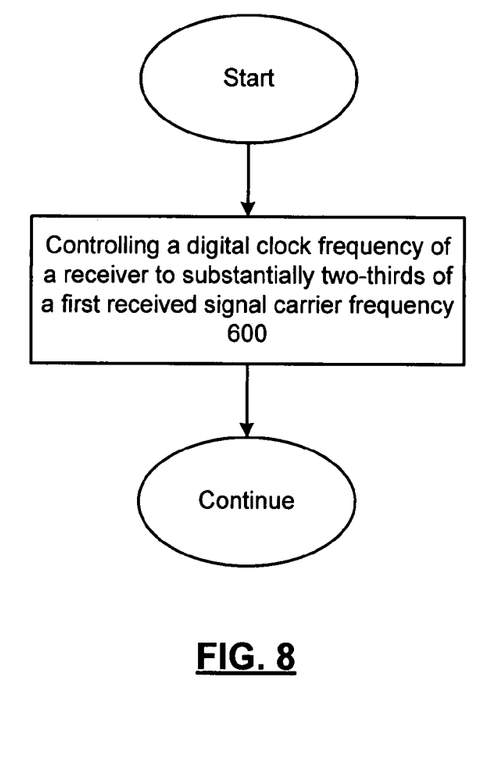
FIG. 8 presents a block diagram of a method in accordance with an embodiment of the present invention.

FIG. 8 presents a block diagram of a method in accordance with an embodiment of the present invention. In particular, a method is presented for use in conjunction with embodiments presented in FIGS. 1-7. The method includes step 600 of controlling a digital clock frequency of a receiver to substantially two-thirds of a first received signal carrier frequency.

Figure 9:
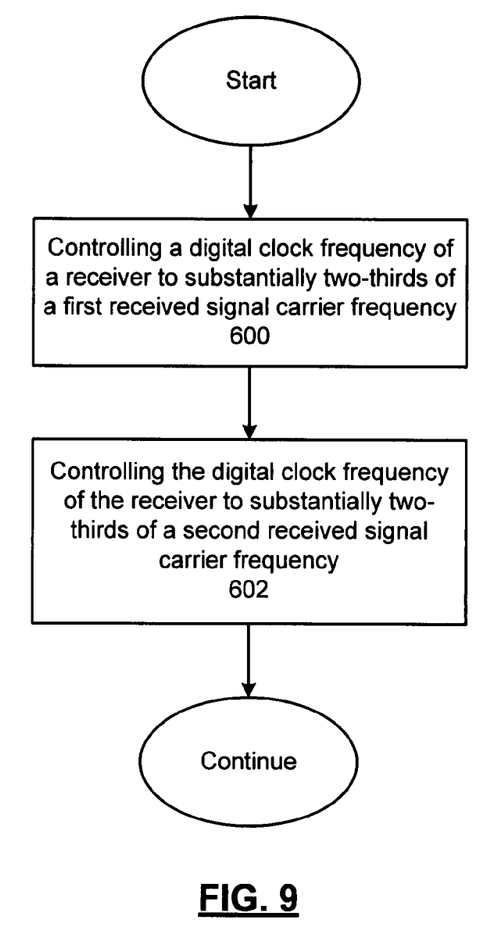
FIG. 9 presents a block diagram of a method in accordance with an embodiment of the present invention.

FIG. 9 presents a block diagram of a method in accordance with an embodiment of the present invention. In particular, a method is presented for use in conjunction with embodiments presented in FIGS. 1-8. In addition to step 600 from FIG. 8, the method includes step 602 for controlling a digital clock frequency of a receiver to substantially two-thirds of second received signal carrier frequency. In an embodiment of the present invention, the first received signal carrier frequency is not equal to the second received signal carrier frequency.

In preferred embodiments, the various circuit components are implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a radio receiver and system on a chip integrated circuit. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A system on a chip integrated circuit comprising:
   an analog front end to:
      receive a radio signal that includes a plurality of analog channel signals, wherein a first channel signal of the plurality of analog channel signals has a first carrier frequency;
      convert the first channel signal into a first digital signal; and
      output the first digital signal;
   a digital clock generator to generate a first digital clock signal corresponding to the first channel signal, wherein the first digital clock signal has a first digital clock frequency that is selected based on the first digital signal; and
   a digital section operably coupled to the analog front end, the digital section to receive the first digital signal and to convert the received first digital signal into a first audio signal, wherein the conversion is based on the first digital clock signal;
   wherein each of the first digital clock frequency and integer multiples of the first digital clock frequency differs from the first carrier frequency.

2. The system on a chip integrated circuit of claim 1, further comprising:
   a channel selector to produce a first control signal that corresponds to the first channel signal; and
   a local oscillator operably coupled to the analog front end and to a reference oscillator, the local oscillator to generate a first local oscillation signal based on the first control signal;
   wherein the digital clock generator includes a divider to divide the first local oscillation signal to produce the first digital clock signal.

3. The system on a chip integrated circuit of claim 2, wherein the divider is to divide the first local oscillation signal by an integer.

4. The system on a chip integrated circuit of claim 3, wherein the integer is equal to six.

5. The system on a chip integrated circuit of claim 2, wherein the divider includes a fractional divider.

6. The system on a chip integrated circuit of claim 1, wherein the first digital clock frequency is substantially equal to two-thirds of the first carrier frequency.

7. The system on a chip integrated circuit of claim 1, wherein the first digital clock frequency is less than the first carrier frequency.

8. The system on a chip integrated circuit of claim 1, wherein the received radio signal is one of a broadcast frequency modulated radio signal, a broadcast amplitude modulated radio signal, a broadcast satellite radio signal, and a broadcast cable signal.

9. The system on a chip integrated circuit of claim 1, wherein the analog front end includes an in-phase signal path and a quadrature-phase signal path.

10. A method comprising:
    receiving a radio signal having a plurality of analog channel signals at an integrated circuit, wherein a first channel signal of the plurality of analog channel signals has a first carrier frequency;
    converting the first channel signal of the plurality of analog channel signals into a first digital signal;
    generating a first digital clock signal having a first digital clock frequency that is selected based at least in part on the first digital signal;
    converting the first digital signal into a first audio signal, wherein the conversion is executed based on the first digital clock signal;
    wherein the first digital clock frequency and integer multiples of the first digital clock frequency differ from the first carrier frequency.

11. The method of claim 10, further comprising:
    producing a first control signal that corresponds to the first channel signal; and
    generating a first local oscillation signal based on the first control signal;
    wherein receiving includes mixing the received radio signal and the first local oscillation signal; and
    wherein generating the first digital clock signal includes dividing the first local oscillation signal to produce the first digital clock signal.

12. The method of claim 11, wherein dividing comprises dividing by an integer.

13. The method of claim 12, wherein the integer is equal to 6.

14. The method of claim 10, wherein the first digital clock frequency is substantially equal to two-thirds of the first carrier frequency.

15. The method of claim 10, wherein the first digital clock frequency has a first digital clock frequency that is less than the first carrier frequency and is greater than zero.

16. The method of claim 10, wherein the received radio signal is one of a broadcast frequency modulated radio signal, a broadcast amplitude modulated radio signal, a broadcast satellite radio signal, and a broadcast cable signal.

17. The method of claim 10, wherein receiving further comprises processing the received radio signal along an in-phase signal path and processing the received radio signal along a quadrature-phase signal path.

* * * * *